United States Patent Office 3,605,894
Patented Sept. 20, 1971

3,605,894
IMPARTING IN SITU STABILITY TO
DISPLACING FLUIDS
Stanley C. Jones, Littleton, Colo., assignor to Marathon
Oil Company, Findlay, Ohio
No Drawing. Continuation-in-part of application Ser. No.
693,103, Dec. 26, 1967, now Patent No. 3,520,366.
This application Oct. 29, 1969, Ser. No. 872,397
Int. Cl. E21b 43/22
U.S. Cl. 166—273           13 Claims

ABSTRACT OF THE DISCLOSURE

A secondary-type recovery process wherein crude oil is recovered from a subterranean formation by displacing therethrough a displacing fluid comprised of electrolyte and/or semi-polar compound is improved by injecting into the formation before the displacing fluid an aqueous pre-slug containing a preferably water soluble semi-polar compound or electrolyte and the preferably water soluble semi-polar compound. Examples of displacing fluids include water- and oil-external emulsions, and water- and oil-external micellar dispersions and miscible-type fluids. A mobility buffer slug can follow the displacing fluid and the displacing fluid and mobility buffer can be displaced through the formation by a drive fluid which can be substantially hydrocarbon or aqueous.

CROSS REFERENCE TO RELATED APPLICATIONS

This is a continuation-in-part of U.S. Ser. No. 693,103, filed Dec. 26, 1967, and now U.S. Pat. No. 3,520,366.

BACKGROUND OF THE INVENTION

U.S. Pat. No. 3,275,075 to Gogarty et al. teaches the use of semi-polar compounds, such as alcohols, amines, and ketones in microemulsions. Such microemulsions are useful in secondary-type oil recovery. U.S. Pat. No. 3,324,944 to Poettmann teaches a "pre-slug" injection of a non-polar organic liquid into the formation to improve the stability of flooding processes using a microemulsion.

Secondary-type recovery processes (including tertiary recovery) utilizing displacing fluids containing electrolyte and/or semi-polar compound sometimes experience a "leaching" or sorption of these components from the displacing fluid. It is postulated that the affinity of the interstitial water for these components tends toward equilibrium conditions at the juncture of the displacing fluid and interstitial water. As a result, the flooding characteristics with these displacing fluids are adversely changed.

Applicants have discovered that by injecting a liquid pre-slug containing semi-polar compound or electrolyte and semi-polar compound into the subterranean formation before injection of the displacing fluid, characteristics of the fluid can be better stabilized to improved oil recovery.

DESCRIPTION OF THE INVENTION

This invention is applicable to a secondary-type recovery process (including tertiary recovery) wherein a subterranean formation is flooded with a displacing fluid containing semi-polar compound and/or electrolyte. The displacing fluid can be any fluid which will effectively displace crude petroleum from the subterranean formation. Examples of such fluids include water- and oil-external emulsions, and water- and oil-external micellar dispersions, miscible type fluids such as semi-polar organic compounds (e.g. alcohols) and substantially hydrocarbon or aqueous fluids containing semi-polar organic compounds, other additives to impart desired characteristics, etc.

Preferably, the displacing fluid is a micellar dispersion. The term "micellar dispersion" as used herein, is meant to include "micro-emulsions [Schulman and Montagne, Annals of the New York Academy of Sciences, 92, pages 366–371 (1961)], oleopathic hydro-micelles [Hoar and Schulman, Nature, 152, page 102 (1943)], "transparent" emulsions (Blair, Jr. et al., U.S. Pat. No. 2,356,205) and micellar solutions defined in U.S. Pat. Nos. 3,254,714; 3,275,075; 3,301,325; 3,307,628; and 3,330,344. Examples of micellar dispersions include those taught in U.S. Pat. No. 3,348,611 to Reisberg.

The micellar dispersions are comprised of hydrocarbon, aqueous medium, and surfactant. Examples of hydrocarbon include crude oil, crude column overheads, straight-run gasoline, liquefied petroleum gases, extracts of crude oil and synthesized hydrocarbons. Useful surfactants include cationic, nonionic and anionic surface-active compounds. A particularly useful surfactant is petroleum sulfonate containing a mono-valent cation (e.g. potassium, sodium, or ammonium). Examples of useful surfactants include those disclosed in U.S. 3,275,075.

Semi-polar compounds, also known as co-surfactants and cosolubilizer, useful with the displacing fluids, especially the micellar dispersions, include alcohols, amines, esters, aldehydes, and ketones containing from one up to about 20 or more carbon atoms. Preferably, the semi-polar compound is an alcohol, e.g. ethanol, isopropanol, n- and isobutanol, the amyl alcohols, 1- and 2-hexanol, 1- and 2-octanol, the decyl alcohols, alkyl aryl alcohols such as p-nonyl phenol and alcoholic liquors such as fusel oil.

Electrolytes useful with the displacing fluids (especially the micellar dispersions) include inorganic bases, inorganic acids, inorganic salts, organic bases, organic acids, and organic salts. Preferably, the electrolytes are inorganic bases, inorganic acids and inorganic salts, e.g. sodium hydroxide, sodium chloride, sodium sulfate, hydrochloric acid, sulfuric acid, and sodium nitrate. Other useful electrolytes can be found in U.S. 3,330,343. Also, the salts contained in brackish or brine water are to be included as electrolytes.

The displacing fluid can also contain other components, e.g. bactericides, corrosion and oxidation inhibitors, sequestering agents, etc.

Some subterranean formations contain interstitial water, including water from waterflooding, which tends to "leach" or "sorb" the semi-polar compound and/or electrolyte from the displacing fluid, especially micellar dispersions. As a result, the operational characteristics of the displacing fluid in the formation are adversely affected.

The use of an aqueous pre-slug containing preferably water soluble semi-polar organic compound or the preferably water soluble semi-polar compound and electrolyte inhibits the tendency of the formation, inter alia, to degrade the displacing fluid and other injected fluids, e.g., a mobility buffer. The pre-slug is different in composition from the displacing fluid, i.e. it is distinct and not the same. Preferably, the pre-slug is aqueous and contains, at least at the juncture with the displacing fluid, sufficient semi-polar compound or semi-polar compound and electrolyte to establish equilibrium with similar components within the front portion of the displacing fluid, this equilibrium is preferably established at the start of the flooding process. The semi-polar compound and electrolyte used in the pre-slug can be identical to similar components used in the displacing fluid. Other components can be incorporated into the pre-slug to impart desired characteristics, e.g. corrosion inhibitors, bactericides, agents to inactivate surfactant sorption sites on the rock surface, etc. Examples of amounts useful in the pre-slug include from about 0.1% to about 5 volume percent or more of the semi-polar compound and from about 0.01% to about 5 weight percent or more of the electrolyte. The aqueous pre-slug can contain less than about 50% hydrocarbon, but preferably contains, at most, only trace amounts of the hydrocarbon. Also, the pre-slug is not a soluble oil or micellar solution.

Electrolytes exhibiting characteristics to reduce the swelling tendency of the clays within the reservoir sands are especially useful where water sensitive clays are encountered. Thus, permeability of the sands can be maintained at a more desired value.

After the pre-slug and displacing fluid are injected into the subterranean formation, there is injected a mobility buffer slug such as LPG (liquefied petroleum gas), water-external emulsion, or a polar material such as water. The mobility buffer should have sufficiently low mobility to protect the displacing fluid from invasion by a subsequent drive fluid, e.g. water drive. The mobility buffer preferably has a mobility equal to about that or less than that of the displacing fluid. More preferably, at least a portion (i.e. from 5% to 100%) of the mobility buffer can have mobilities graded from a low of about that of the displacing fluid to a high of about that of the water drive. Thereafter, sufficient amounts of a drive fluid, e.g. hydrocarbon or aqueous medium, are injected into the formation to displace the pre-slug, displacing fluid and mobility buffer (optional) toward a production well.

The mobility buffer is preferably water containing a mobility reducing agent. Useful examples of mobility buffers (also known as thickened drive materials) are found in United States Patent No. 3,261,399 to Coppel. Any agent which will effectively reduce the mobility (e.g. increases the apparent viscosity and/or decrease permeability of rock) of the mobility buffer and which is compatible with the mobility buffer and the displacing fluid is useful with ths invention. Preferred mobility reducing agents include polysaccharides, polyacrylamides, etc.

Generally, the amount of pre-slug injected into the formation will depend upon the particular characteristics of the formation, and on the composition and amount of the displacing fluid. The volume of the pre-slug is preferably about equal to the volume of the displacing fluid injected into the formation. Generally, the amount of the pre-slug need be only about 1% to about 30% and preferably from about 2% to about 10% formation pore volume. The amount of the displacing fluid can range from about 1% up to about 30% and preferably from about 2% up to about 10% formation pore volume when micellar dispersions are used.

The following examples are presented to specifically illustrate working embodiments of the invention. The examples are not intended to limit in any way the invention. The operational procedure, components within the pre-slugs, components within the micellar dispersions, etc. can be varied. It is intended that all equivalents known or obvious to those skilled in the art be included within the scope of this invention as defined in the specification and appended claims. Percents are based on volume unless otherwise specified.

Example I

Berea sandstone cores 4 feet long by 2 inches in diameter having characteristics indicated in Table 1 are saturated with distilled water containing 16,500 p.p.m. of NaCl and are then flooded to irreducible water saturation with crude oil taken from the Wilkin lease in Illinois (a sweet, black crude oil having a 9.0 cp. viscosity at 72° F. and a specific gravity of 0.846). Core samples B and C are flooded with 10% pore volume of a pre-slug composed of 18,000 p.p.m. of NaCl dissolved in distilled water and containing amounts of isopropanol indicated in Table 1. Core sample A is not treated with a pre-slug. The cores are flooded with 10% formation pore volume of a micellar dispersion consisting of 62.7% straight-run gasoline, 10.5% of an ammonium petroleum sulfonate (containing about 80% active sulfonate), 1.8% isopropanol and 25% of distilled water containing 9,000 p.p.m. of NaCl. Thereafter, there is injected into the cores 1.2 pore volumes of a mobility buffer (thickened water) composed of 500 p.p.m. of No. 530 Pusher (a high molecular weight partially hydrolyzed polyacrylamide sold by Dow Chemical Company), 500 p.p.m. of NaCl and 50 p.p.m. of $NH_4SCN$ dissolved in distilled water. Table 1 contains results of the core tests:

TABLE 1

| Sample | Core characteristics ||| Preslug composition, 18,000 p.p.m. NaCl plus indicated percent of isopropanol | Crude oil recovery ||
|---|---|---|---|---|---|---|
| | Effective porosity (percent) | Permeability (md.) | Percent oil saturation | | Percent recovery of crude in core | Percent improvement over Sample A |
| A | 18.4 | 189 | 64.7 | Not treated with pre-slug. | 82.3 | 0 |
| B | 19.9 | 307 | 63.8 | 1 | 91.2 | 11 |
| C | 20.5 | 215 | 65.7 | 2 | 93.6 | 14 |

Example II

Fired Berea sandstone core 4 feet long by 2 inches in diameter having characteristics indicated in Table 2 is first saturated with water obtained from the Henry lease in Illinois (contains about 18,000 p.p.m. of total dissolved solids, hereinafter identified as Henry water), flooded to irreducible water saturation with crude oil obtained from the Henry lease in Illinois (a sweet, black crude oil having about 7 cp. viscosity at 72° F. and a specific gravity of 0.843, hereinafter identified as Henry crude oil) and then flooded with Henry water to residual oil saturation. The core sample is then flooded with 5% formation pore volume of a pre-slug having the composition indicated in Table 2. Thereafter, the sample is injected with a water-external micellar dispersion (percent pore volume indicated in Table 2), the dispersion composed of 27.42% Henry crude oil, 6.67% of an ammonium petroleum sulfonate (having an average molecular weight of about 450 and composed of about 80% active sulfonate), 0.74% of isopropanol, 0.56% of nonyl phenol, 64.61% of water treated from the Palestine water reservoir in Palestine, Illinois (containing about 400 p.p.m. of total dissolved solids, hereinafter identified as Palestine water) and 0.979 weight percent of sodium hydroxide (based on the water). Thereafter, the core is injected with 1.2 pore volumes of a thickened water slug composed of 800 p.p.m. of No. 530 Pusher, 50 p.p.m. of $NH_4SCN$, 4% of isopropanol, and 96% Palestine water. Results of the core flooding tests are indicated in Table 2:

TABLE 2

| Sample | Core characteristics | | | Pre-slug composition | Water-external micellar solutions (percent pore volume) | Percent recovery of crude oil in core |
|---|---|---|---|---|---|---|
| | Effective porosity (percent | Permeability (md.) | Residual oil saturation (percent) | | | |
| A | 18.4 | 98 | 37.3 | Palestine water plus 1% NaOH | 3 | 86.3 |
| B | 18.5 | 97 | 37.8 | Palestine water | 3 | 78.1 |
| C | 18.9 | 176 | 37.0 | Palestine water plus 4% isopropanol | 3 | 72.4 |
| D | 19.5 | 180 | 37.6 | 70% Henry water plus 30% Palestine water. | 5 | 86.4 |

What is claimed is:

1. A process for the recovery of crude oil from a subterranean formation wherein a displacing fluid comprised of electrolyte and/or semi-polar compound is injected into and displaced through the formation to recover crude oil through at least one production means in fluid communication with the formation, the process comprising injecting before the displacing fluid an aqueous pre-slug containing preferably water soluble semi-polar organic compound or electrolyte and the preferably water soluble semi-polar organic compound, the aqueous pre-slug not being a soluble oil or micellar solution and being different in composition from the displacing fluid.

2. The process of claim 1 wherein the displacing fluid is a miscible-type fluid.

3. The process of claim 1 wherein the component(s) within the back portion of pre-slug is/are initially at substantial equilibrium with similar component(s) within the front portion of the displacing fluid.

4. The process of claim 1 wherein the displacing fluid is a micellar dispersion.

5. A process for the recovery of crude oil from a subterranean formation wherein a displacing fluid is injected into the formation through at least one injection means to displace the crude oil toward at least one production means, the successive injections into the formation comprising:
   (1) an aqueous pre-slug comprised of component(s) selected from the group consisting of preferably water soluble semi-polar organic compound, and combination of electrolyte and preferably water soluble semi-polar organic compound, the aqueous pre-slug not being a soluble oil or micellar solution and being different in composition from the displacing fluid,
   (2) a displacing fluid comprised of component(s) selected from the group consisting of electrolyte, semi-polar organic compound, and combination of electrolyte and semi-polar compound,
   (3) a mobility buffer, and
   (4) a drive fluid in amounts sufficient to displace the pre-slug, displacing fluid, and the mobility buffer toward at least one production means and recovering crude oil through said production means.

6. The process of claim 5 wherein the component(s) within the back portion of the aqueous pre-slug is/are substantially in equilibrium with the component(s) in the front portion of the displacing fluid.

7. The process of claim 5 wherein the displacing fluid is a micellar dispersion.

8. The process of claim 5 wherein the mobility buffer has a mobility about equal to or less than the mobility of the displacing fluid.

9. A process for the recovery of crude oil from a subterranean formation wherein a micellar dispersion is injected into the formation through at least one injection means to displace the crude oil toward at least one production means, the successive injections comprising:
   (1) an aqueous pre-slug comprised of component(s) selected from the group consisting of preferably water soluble semi-polar organic compound and preferably water soluble semi-polar organic compound and electrolyte, the aqueous pre-slug not being a soluble oil or micellar solution,
   (2) a micellar dispersion comprised of hydrocarbon, water, surfactant, semi-polar compound, and electrolyte,
   (3) a mobility buffer, and
   (4) sufficient water drive to displace the micellar dispersion and mobility buffer toward the production means and recovering crude oil through said production means.

10. The process of claim 9 wherein the pre-slug contains preferably water soluble semi-polar organic compound and electrolyte.

11. The process of claim 9 wherein the electrolyte and semi-polar compound within the back portion of the aqueous pre-slug are present in sufficient concentration to initially establish equilibrium with the electrolyte and semi-polar compound in the front portion of the micellar dispersion.

12. The process of claim 9 wherein the mobility buffer has a mobility about equal to or less than the mobility of the micellar dispersion.

13. The process of claim 9 wherein a portion of the mobility buffer is characterized as having graded mobilities increasing from a low of about that of the micellar dispersion to a high of about that of the water drive.

References Cited

UNITED STATES PATENTS

| 3,266,570 | 8/1966 | Gogarty | 166—273 |
| 3,297,084 | 1/1967 | Gogarty et al. | 166—273 |
| 3,406,754 | 10/1968 | Gogarty | 166—273 |

STEPHEN J. NOVOSAD, Primary Examiner